US012767098B2

(12) United States Patent
Grubauer et al.

(10) Patent No.: US 12,767,098 B2
(45) Date of Patent: Oct. 20, 2026

(54) BRAKING DEVICE FOR A DRIVE ASSEMBLY OF A VEHICLE, AND A VEHICLE HAVING THE DRIVE ASSEMBLY

(71) Applicant: Schaeffler Technologies AG & Co. KG, Herzogenaurach (DE)

(72) Inventors: Benedikt Grubauer, Neresheim (DE); Simon Ortmann, Pulheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 19/106,223

(22) PCT Filed: Jul. 27, 2023

(86) PCT No.: PCT/DE2023/100556
§ 371 (c)(1),
(2) Date: Feb. 25, 2025

(87) PCT Pub. No.: WO2024/041691
PCT Pub. Date: Feb. 29, 2024

(65) Prior Publication Data

US 2026/0070521 A1 Mar. 12, 2026

(30) Foreign Application Priority Data

Aug. 26, 2022 (DE) ..................... 10 2022 121 626.8

(51) Int. Cl.
*B60T 1/06* (2006.01)
*B60T 8/17* (2006.01)
(Continued)

(52) U.S. Cl.
CPC ................ *B60T 1/062* (2013.01); *B60T 8/17* (2013.01); *F16D 55/36* (2013.01);
(Continued)

(58) Field of Classification Search
CPC ...... B60T 1/062; B60T 8/17; B60T 2270/402; F16D 55/36; F16H 57/0006; F16H 2057/0012
See application file for complete search history.

(56) References Cited

U.S. PATENT DOCUMENTS 5,529,459 A 6/1996 Pancotti
2015/0060230 A1* 3/2015 Neuberth ............... F16D 48/06
192/30 V (Continued)

FOREIGN PATENT DOCUMENTS

DE 102018119192 A1 2/2020
DE 102019103771 A1 5/2020

(Continued)

OTHER PUBLICATIONS

FR2493944A1 Machine English Translation (Year: 1982).*

*Primary Examiner* — Jason D Shanske
*Assistant Examiner* — Matthew James O'Neill

(57) ABSTRACT

A braking device for a drive assembly of a vehicle includes an input shaft, a brake and a brake coupling device. The brake has first and second braking partners, and the first braking partner is arranged in a stationary manner in the braking device. The input shaft, the brake and the brake coupling device form sub-portions of a torque path through the braking device. The brake coupling device has a first coupling partner and a second coupling partner. In a coupling state, the brake coupling device rotationally fixedly couples the first coupling partner to the second coupling partner in order to close the torque path, and, in a release state, decouples the first coupling partner from the second coupling partner in order to open the torque path. A one of the first coupling partner and the second coupling partner is connected to the input shaft for rotation therewith.

9 Claims, 12 Drawing Sheets

(51) Int. Cl.
*F16D 55/36* (2006.01)
*F16H 57/00* (2012.01)

(52) U.S. Cl.
CPC .... *F16H 57/0006* (2013.01); *B60T 2270/402* (2013.01); *F16H 2057/0012* (2013.01)

(56) References Cited

U.S. PATENT DOCUMENTS

| | | | | |
|---|---|---|---|---|
| 2018/0142759 | A1* | 5/2018 | Finkenzeller | B60K 6/387 |
| 2018/0215368 | A1* | 8/2018 | Isono | B60T 13/748 |
| 2019/0351751 | A1* | 11/2019 | Sato | B60K 6/48 |

FOREIGN PATENT DOCUMENTS

| | | | | |
|---|---|---|---|---|
| DE | 102018131525 A1 | | 6/2020 | |
| DE | 102022121623 B3 | | 2/2024 | |
| FR | 2493944 A1 | * | 5/1982 | B60W 10/18 |

* cited by examiner

BRAKING DEVICE FOR A DRIVE ASSEMBLY OF A VEHICLE, AND A VEHICLE HAVING THE DRIVE ASSEMBLY

CROSS-REFERENCE TO RELATED APPLICATIONS

This application is the United States National Phase of PCT Appln. No. PCT/DE2023/100556 filed Jul. 27, 2023, which claims priority to German Application No. DE102022121626.8 filed Aug. 26, 2022, the entire disclosures of which are incorporated by reference herein.

TECHNICAL FIELD

The present disclosure relates to a braking device for a drive assembly of a vehicle. The disclosure also relates to a vehicle having the drive assembly.

BACKGROUND

The transition from vehicles with combustion engines to partially electrified or even fully electrified vehicles is creating new requirements for other components of the drive train. One significant change in at least partially electrified vehicles, for example, is that a recuperation brake is often used in addition to the actual service brake. The service brake is a safety-relevant device that must comply with a number of legal requirements. The recuperation brake, on the other hand, is designed as an optional additional brake, which has advantages over the service brake in terms of energy recovery, wear resistance, etc.

SUMMARY

The present disclosure relates to a braking device, which is suitable and/or designed for a drive assembly of a vehicle. The drive assembly may have at least one electric drive unit, which is designed to provide a drive torque for the vehicle.

The vehicle is designed, in particular, as a hybrid vehicle or as a purely electric vehicle. The vehicle is designed, for example, as a passenger car, a minibus, a van or the like. The vehicle may be assigned to class M1 or N1 according to EU Regulation 2018/858. In particular, the vehicle is designed as a road vehicle and/or is approved and/or suitable for road traffic. For example, the vehicle can reach a maximum speed of more than 80 km/h, e.g., more than 120 km/h and in particular more than 140 km/h. Alternatively, the vehicle is designed as a rail vehicle.

The braking device has an input shaft, and the input shaft is suitable and/or designed for the introduction and/or dissipation of torques. Thus, a drive torque can be introduced from the drive assembly into the braking device via the input shaft and/or a braking torque can be outputted from the braking device via the input shaft. The input shaft can be designed as a structural component which is exclusively assigned to the braking device. Alternatively, the input shaft is formed by another shaft, such as a rotor shaft, connecting shaft, transmission shaft, etc. of the drive assembly.

The braking device has a brake, and the brake includes a first braking partner and a second braking partner. The first and the second braking partners can interact with each other to generate a braking torque. For example, the first and the second braking partners can come into grinding and/or frictional contact to generate the braking torque. The braking device is designed in particular as a dynamic braking device and/or as a braking device for actuation during driving operation of the vehicle. In particular, the braking device is not designed as a parking brake or at least not purely as a parking brake. It is provided that the first braking partner is arranged in a stationary manner in the braking device; the second braking partner is designed as a rotating braking partner.

The braking device has a brake coupling device, and the brake coupling device, the input shaft and the brake form sub-portions of a torque path of the brake coupling device.

The brake coupling device has a first coupling partner and a second coupling partner. The first and the second coupling partners can be rotationally fixedly coupled to one another, in which case the brake coupling device is in a coupling state. Alternatively, the first and second coupling partners can be decoupled such that they can rotate independently relative to each other, in which case the brake coupling device is in a release state. In the coupling state, the torque path is closed; in the release state, the torque path is open.

It is provided that one of the coupling partners is connected, in particular always connected, to the input shaft for rotation therewith. Thus, this coupling partner forms a constantly rotating assembly with the input shaft.

It is a consideration of the disclosure that the braking device forms an optional and/or engageable brake, which is decoupled from the drive assembly in the release state of the brake coupling device and in this way does not negatively influence the driving operation. For example, in the release state, the rotating masses of the drive assembly are reduced compared to the coupling state. Furthermore, when the braking device is not in use, adverse drag torques or noise emissions are reduced or set to 0. In the event that the braking device is in a braking readiness state, the brake coupling device is set to the coupling state such that the brake can be used for the drive assembly, and thus for the vehicle, if required.

The braking device thus creates new operating states of the braking system of the drive assembly and/or of the vehicle, such that new and further functions can be implemented.

The braking device can be designed to switch automatically or to switch by means of a switching signal. For reasons of comfort and safety, it is preferred that the switching process takes place smoothly.

In an example embodiment, the other coupling partner is connected to the second braking partner for rotation therewith. The brake coupling device is thus designed for the releasable coupling of the input shaft with the second braking partner. Thus, the brake coupling device can close or open the torque path between the input shaft and the second braking partner, such that, in a coupling state, the brake coupling device rotationally fixedly couples the input shaft to the second braking partner and, in a release state, decouples the input shaft from the second braking partner.

Alternatively, the other coupling partner can be and/or is connected to a transmission shaft of the drive assembly of the vehicle. The brake coupling device is thus designed for the releasable coupling of the input shaft with the transmission shaft. Thus, the brake coupling device can close or open the torque path between the input shaft and the transmission shaft, such that, in a coupling state, the brake coupling device rotationally fixedly couples the input shaft to the transmission shaft and, in a release state, decouples the input shaft from the transmission shaft.

With respect to the torque path, the braking device forms an end point or a dead-end, as the drive torque of the drive assembly is not directed through the braking device. In particular, the braking device forms a dead-end path, for the torque path, which is in particular unbranched. Alternatively or additionally, the braking device has only a single torque interface.

In an example embodiment, the braking device is designed as a multi-disc brake, in particular as a wet or wet-running multi-disc brake. In particular, the braking device has a rotatable inner disc pack, wherein the inner disc pack forms the second braking partner. Furthermore, the braking device has an outer disc pack, wherein the outer disc pack is supported in the braking device in a stationary manner and forms the first braking partner. The multi-disc brake may have an actuator device, wherein the actuator device can set the multi-disc brake into a braking state or into a release state. The actuator device is designed, for example, as an axial actuator device which can apply an axial force to at least one of the disc packs. The actuator device can in particular be designed as a pneumatic, hydraulic and/or electrically acting actuator device.

The multi-disc brake is designed in particular as an enclosed multi-disc brake. This may be designed as a wet or wet-running multi-disc brake, wherein the discs of the disc packs run in a temperature control fluid. This embodiment allows the braking device to be operated without emissions and avoids the escape of fine dust particles, as these are bound in particular by the temperature control fluid. The advantage of the wet or wet-running multi-disc brake is that it has a positive acoustic behavior. Any braking noise that can occur especially in dry braking systems is avoided, which improves the operating behavior.

In an example embodiment, the brake coupling device is in an energy-free and/or actuation force-free state in the coupling state and/or in the freewheel state, such that the set state of the brake coupling device is self-retaining. The idea is that no further axial force is required in the actuated state. Axial force is only required for switching; in the engaged state, the braking device can be switched in a force-free manner, since the torque is transmitted by a form-fitting connection. This embodiment makes it possible to operate the braking device in a way that is both reliable and energy-efficient, despite the new functionality.

In an example implementation, the brake coupling device is designed as a synchronization device, in particular as a single synchronization unit. This means that it has the function of implementing the transition between the freewheel state and the coupling state during driving operation, i.e., even when the input shaft and/or transmission shaft are rotating, without any disruptive engagement reactions of the braking device occurring. In this implementation, the braking device can be brought into a braking readiness state by adjusting the coupling state of the brake coupling device without a driver of the vehicle being able to perceive this change at all or clearly.

The disclosure further relates to a vehicle having the drive assembly and having the braking device as previously described.

The drive assembly has an electric drive unit, in particular an electric motor, for generating the drive torque for the vehicle. It may be provided that the electric drive unit is the only traction machine for the vehicle. Alternatively, the vehicle has additional traction machines, for example additional electric drive units and/or an internal combustion engine to generate the drive torque. The drive assembly may provide at least 20%, in particular at least 40% and especially at least 80% of the drive torque for the vehicle.

The electric drive unit can be assigned to a single driven wheel of the vehicle and/or be designed as a single-wheel drive. Alternatively, the electric drive unit is assigned to two driven wheels, e.g., a common axle and/or is designed as an electric axle. In other embodiments, the electric drive unit can also be assigned to all driven wheels and/or wheels of the vehicle and/or be designed as an all-wheel drive.

The drive assembly has a transmission gearing for translating the drive torque, which is introduced into the transmission gearing via a gearing input. An example method is to ‘step down’ from fast to slow, also known as gear reduction. The transmission gearing is designed to output a transmitted drive torque based on the drive torque from the electric drive unit at a gearing output in the direction of the at least one driven wheel of the vehicle. For example, the transmission gearing has a gearing output via which the translated drive torque is outputted in the direction of at least one driven wheel of the vehicle. Optionally, a transmission gearing, in particular a differential, and/or a summation gearing for combining the translated drive torque with other drive torques is connected downstream of the transmission gearing. Starting from the drive unit, a drive torque path runs to the gearing output and/or to the at least one driven wheel.

The vehicle, in particular the drive assembly, has the braking device for generating a braking torque on the at least one driven wheel. Starting from the braking device, a braking torque path runs to at least one driven wheel. The torque path forms a sub-portion of the braking torque path. Thus, the braking torque is generated by the braking device and directed to the at least one driven wheel via the braking torque path. The braking device acts on the drive torque path. In particular, the drive torque path and the braking torque path intersect or meet in front of at least one driven wheel.

In a possible further development, the vehicle has a temperature management device, wherein the temperature management device is designed to supply the braking heat of the braking device to a useful function via the temperature control fluid. In the useful function, the braking heat can be used, for example, to heat up the transmission gearing, to control the temperature of the battery and/or to control the temperature of the passenger compartment.

It is possible that the braking device is designed as a passive heating device and that the braking heat is generated primarily from traffic-related braking.

In a possible further development, the braking device is designed to operate as an active heating device. The temperature management device controls the drive unit such that an additional drive torque is specifically directed from the electric drive unit to the braking device. Furthermore, the temperature management device controls the braking device to apply a corresponding additional braking torque in order to compensate for the additional drive torque. In this way, active braking heat is generated, which is fed to the useful function via the temperature management device.

In another possible further development, the braking device is designed to work as an active auxiliary heater: for this purpose, the drive assembly has a drive coupling device which is designed to separate the drive torque path. The temperature management device is designed to control the drive coupling device such that the drive torque path is separated. In addition, the temperature management device controls the drive unit and the braking device to generate a drive torque, which is passed to the braking device and is reduced again by the braking torque in order to actively generate braking heat when stationary. As before, the braking heat is directed to the useful functions via the temperature management device.

The vehicle may have a vibration management device which is designed to compensate and/or dampen vibrations in the drive assembly, the drive unit, the transmission gearing and/or the vehicle as a vibrating system by controlling the braking device. For this purpose, the vibration management device has, for example, sensors for measuring the vibrations to be dampened. In one possible embodiment, the vibration management device controls the braking device in order to actuate the braking device, in particular the multi-disc brake, in particular independently of a braking process, and thereby to dampen the vibrating system and/or to shift resonance frequencies. In general, the vibrating system is detuned by the actuation of the braking device, in particular the multi-disc brake, such that the vibrations are dampened and/or compensated.

The vibration management device is designed to close the brake coupling device depending on the measured vibrations to be dampened in order to compensate and/or dampen vibrations that occur. By closing the brake coupling device, the rotating masses of the braking device are connected to the vibrating system, such that the vibration behavior of the vibrating system changes in order to compensate and/or dampen the occurring vibrations.

The vehicle may have a service brake, wherein the braking device is designed as a complementary brake to the service brake and/or a supplementary braking device to the service brake. This proposes a particularly advantageous application of the drive assembly:

- the service brake in the vehicle may be designed as a friction brake, in particular as a dry friction brake, in particular as a disc and/or drum brake.

During the decelerations typical in urban traffic, the majority of the braking task is taken over by the friction brake or the recuperation brake. Shortly before the vehicle comes to a standstill, the use of the recuperation brake is not technically feasible; here the friction brake provides either the majority or the entire share of the required braking power.

In vehicles with the electric drive unit, the masking noise of the combustion engine is missing; in hybrid vehicles, the combustion engine may be deactivated. Previously irrelevant operating noises of the vehicle are noticed by the driver and can be perceived as disturbing. Thus, a reduction in noise emissions leads to an improvement in operating characteristics.

The regulations (for example UNECE 13H for vehicle class M1) also result in strict safety requirements for the service brake with regard to emergency braking, hot braking performance and reliability. Further requirements are to be expected in the future, most notably the limitation of the permissible emission of fine dust particles from the brakes.

A conflict of objectives can be derived from this field of tension: the friction brake must be able to meet the safety requirements, have high-quality acoustic behavior and at the same time reduce the emission of fine dust particles. In the event of emergency braking, however, braking noise is negligible. The focus here is solely on preventing accidents, i.e., damage to property and/or personal injury.

This conflict of objectives is mitigated by the vehicle having the drive assembly: the braking device as a complementary brake and/or redundant braking device intervenes, for example, in urban environments where the friction brake can no longer resolve the conflict of objectives and/or the recuperation brake can no longer be used. It is emission-free and/or has positive acoustic behavior as a wet-running multi-disc brake.

Since the braking device designed as a complementary brake and/or supplementary braking device still requires a conventional service brake (for example designed as a disc or drum brake), the safety-relevant requirements continue to remain with the service brake, in particular with the friction brake. This improves the operating characteristics of the drive assembly and/or the vehicle, taking into account safety and/or environmental requirements.

Towards the end of the deceleration process, the main braking deceleration can be generated by the service brake. This must be designed both for safe, controlled emergency braking from high speeds with a short braking distance, and also not produce any noise that the driver perceives as disturbing when braking from lower speeds. Since the braking device can replace the friction brake when braking from lower speeds, manufacturers of friction brakes can focus their optimization efforts on controlled emergency braking and gain new scope for action in the vehicle with the drive assembly. During emergency braking, the acoustic behavior is of secondary importance compared to everyday braking in urban traffic. Since the braking device may not claim to have a safety function—the service brake remains intact and fully operational—it can be arranged in front of the transmission gearing.

In an example development, the vehicle has a brake management device for controlling the service brake and the braking device.

The brake management device may be designed to implement an emergency braking state, wherein, in the emergency braking state, the service brake, in particular the friction brake, brings the vehicle to a standstill, wherein, in the emergency braking state, at least the main braking deceleration or the exclusive braking deceleration is implemented by the friction brake of the service brake. This means that all safety requirements are met.

Alternatively or additionally, the brake management device is designed to implement a recuperation braking state, wherein at least part of the braking deceleration is implemented by a recuperation braking of the recuperation brake. This enables environmentally-conscious and comfortable driving.

Alternatively or additionally, the brake management device is designed to implement a comfort braking state, wherein the main braking deceleration is carried out by the braking device in order to bring the vehicle to a standstill. In particular, the brake management device is designed to implement the comfort braking state at speeds of less than 20 km/h, in particular less than 15 km/h and/or even in a range greater than 10 km/h. In these speed states, the recuperation braking can no longer work effectively, wherein in particular the braking device is used instead of the friction brake. In the comfort braking state, the braking of the vehicle to a standstill is achieved with little or no noise emission, since this is implemented completely or largely by the braking device.

The disclosure also relates to a method for operating the vehicle having the drive assembly as previously described, wherein at least one of the operating states is implemented by the brake management device.

The temperature management device, the vibration management device and/or the brake management device may be designed as digital data processing devices.

The braking torque path may run via the transmission gearing, wherein the braking device is arranged in the braking torque path in front of the transmission gearing. This means that the braking device is located in the drive assembly in a portion in which the drive torque has not yet been transmitted by the transmission gearing. In an example embodiment, the speed of the braking device is higher than the speed at the gearing output and/or at the driven wheel.

The braking device may be arranged close to the drive unit and not close to the wheel. This position leads to two possible advantages: the braking device is arranged in an area in which the speed has not yet been transmitted by the transmission gearing and is therefore higher than at the driven wheel and/or at the gearing output. This reduces the braking torque that the braking device has to apply and the multi-disc brake can be used instead of a dry friction brake.

In an example embodiment, the electric drive unit has a rotor shaft, wherein the braking device is rotationally coupled to the rotor shaft in the braking readiness state, e.g., connected in a rotationally fixed manner. Alternatively or additionally, it is claimed that the braking device is operated at the engine speed of the drive unit.

In an example development, the braking torque path runs via the electric drive unit, wherein the braking device is arranged in the braking torque path in front of the electric drive unit. Thus, the braking torque is introduced by the braking device into the braking torque path, via the electric drive unit and via the transmission gearing and in particular via the gearing output, and then directed to the at least one driven wheel. The rotor shaft may be rotationally coupled, e.g., non-rotatably connected, with one axial side—optionally directly or, if necessary, with the interposition of further components—to the braking device and is rotationally coupled, e.g., rotationally fixedly connected, with the other side—optionally directly or, if necessary, with the interposition of further components—to the transmission gearing.

On one hand, a drive torque path runs from the electric drive unit to at least one driven wheel. Furthermore, in this further development, a drive torque counter-path runs from the drive unit to the braking device, wherein a drive torque can also be passed to the braking device. With respect to the drive torque counter-path, the braking device forms an end point or a dead-end, as the drive torque of the electric drive unit is not directed through the braking device. In particular, the braking device forms a dead-end path for the drive torque counter-path. The torque path forms a sub-portion of the drive torque counter-path.

From a drive technology perspective, the electric drive unit in this further development is arranged between the braking device and the transmission gearing. This arrangement makes it particularly easy to integrate the braking device, as there is no need to intervene in the drive torque path. Rather, the braking device can be arranged on one side of the drive unit and the transmission gearing on the other side of the drive unit.

In an alternative embodiment, the braking device is arranged in the drive torque path between the drive unit and the transmission gearing. In particular, the braking device acts on a transmission shaft or a transmission shaft portion between the drive unit and the transmission gearing. In this configuration, the drive assembly can be implemented particularly compactly.

In a further alternative embodiment, the braking device is arranged outside the drive torque path. In particular, the gearing input of the transmission gearing forms a branch point, wherein the drive torque path and the braking torque path meet for the first time at the branch point. From a structural point of view, the drive unit is arranged on one axial side of the transmission gearing and the braking device is arranged on the other side of the transmission gearing. On one hand, a drive torque path runs from the electric drive unit to at least one driven wheel. Furthermore, in this further development, a drive torque branch path runs without transmission from the drive unit through the transmission gearing to the braking device, wherein a drive torque can also be transmitted to the braking device. With respect to the drive torque branch path, the braking device forms an end point or a dead-end, as the drive torque of the electric drive unit is not directed through the braking device. In particular, the braking device forms a dead-end path for the drive torque branch path. The torque path forms a sub-portion of the drive torque branch path.

In an example implementation, the braking device and the rotor shaft are arranged coaxially, wherein the braking device has a brake rotational axis which is aligned coaxially to the axis of rotation of the rotor shaft. This implementation allows the drive assembly to be made particularly compact, which reduces the integration effort and improves the operating characteristics are improved.

In an example development, the drive assembly has an additional module, wherein the additional module has a module housing, wherein the braking device is arranged in the module housing. The drive assembly has a main housing, wherein the drive unit and optionally additionally the transmission gearing are arranged in the main housing. In particular, the additional module forms an independent subassembly. The additional module may be attached to the main housing in a detachable manner, in particular in a non-destructive detachable manner. For example, the additional module, in particular the module housing, is flanged, screwed and/or detachably attached to the main housing for easy assembly. In particular, the additional module is arranged on the main housing to support the braking torque, such that counterforces occurring when the braking torque is generated can be diverted from the braking device via the module housing to the main housing.

The main housing may form an electric axle and/or another, independent subassembly with the drive unit and optionally additionally with the transmission gearing. This further development makes it easier to mount the additional module with the braking device on already developed drive units, in particular electric axles, such that the integration effort is reduced. In this way, the additional module can be used as an independent assembly in a variety of different drive units.

A further optional subject matter of the disclosure relates to the additional module for the vehicle and/or the drive assembly as previously described. The additional module has a module housing for connection to the main housing and the braking device, wherein the braking device is arranged in the module housing. In particular, the additional module is designed as an independent subassembly. The additional module forms an end point for a path, in particular the torque path, the drive torque counter-path or the drive torque branch path via which a drive torque can be introduced into the additional module. In particular, the additional module is designed as a dead-end module with only a single torque interface.

BRIEF DESCRIPTION OF THE DRAWINGS

Further features, advantages and effects of the disclosure arise from the following description of exemplary embodiments and the attached figures. In the figures.

DETAILED DESCRIPTION

Figure 1:
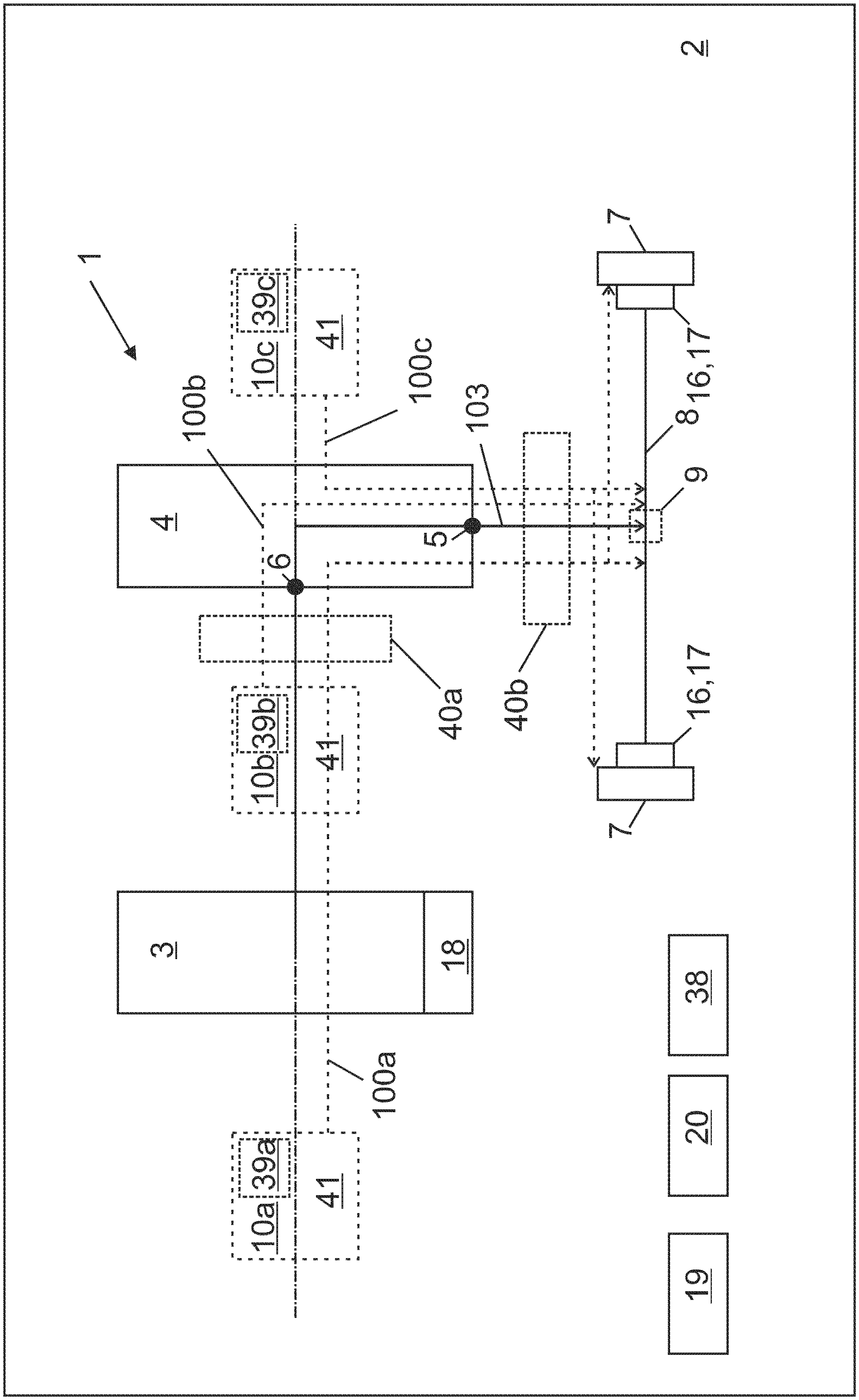
FIG. 1 shows a highly schematic block diagram of a drive assembly for a vehicle and the vehicle as an exemplary embodiment.

FIG. 1 shows a drive assembly 1 for a vehicle 2 in a schematic block diagram. The vehicle 2 is designed, for example, as a passenger car. In particular, the vehicle 2 is realized as an electric vehicle. The drive assembly 1 has an electric drive unit 3, wherein the electric drive unit 3 is designed for generating a drive torque for the vehicle 2. In particular, the drive unit 3 is designed as an electric motor. Optionally, the drive unit 3 can be used as a generator.

The drive assembly 1 has a transmission gearing 4, which is designed to translate the drive torque from the drive unit 3, namely "from fast to slow". The transmission gearing 4 has a gearing output 5 and a gearing input 6, wherein the rotational speed at the gearing output 5 is lower than at the gearing input 6.

The vehicle 2 has at least one driven wheel 7. In the exemplary embodiment shown, the vehicle 2 has two driven wheels 7 of a common axle 8. The stepped-up drive torque generated by the transmission gearing 4 is directed towards the driven wheels 7. For example, a differential 9 can still be connected in the torque flow. Alternatively, only one driven wheel 7 is provided, wherein the drive assembly 1 is designed as a single-wheel drive. It is also possible that the drive torque is distributed to driven wheels 7 of different axes 8.

A drive torque path 103 is formed, which runs from the drive unit 3 into the gearing input 6 and/or the transmission gearing 4 and subsequently leads to the driven wheels 7, in particular via the gearing output 5.

Optionally, a drive coupling device 40*a, b* is provided, wherein the drive coupling device 40*a, b* is designed to separate the drive torque path 103 behind the drive unit 3. This allows the drive unit 3 to rotate without any drive torque being passed to the gearing output 5 or to the driven wheels 7. FIG. 1 shows two different exemplary embodiments for the position of the drive coupling device 40*a, b*. Alternatively, in further exemplary embodiments, the drive coupling device 40*a, b* can be arranged in the transmission gearing 4 or after the differential 9. The drive coupling device 40*a* is arranged between the drive unit 3 and the transmission gearing 4. In the event that the braking device 10*b* is used, the braking device 10*b* is arranged in the drive torque path 103 in front of the drive coupling device 40*a*. The drive coupling device 40*b* is arranged in the drive torque path 103 behind the gearing output 5.

The drive assembly 1 has a braking device 10*a, b, c*, which is designed to generate a braking torque on or for the driven wheel(s) 7 and to guide it to the driven wheels 7 via a respective braking torque path 100*a, b, c*. FIG. 1 shows three different exemplary embodiments for the position of the braking device 10*a, b, c* as well as for the braking torque paths 100*a, b, c*, which are selected alternatively.

The braking device 10*a, b, c* is designed in particular as a dynamic brake and is not limited to the function of a parking brake. In particular, the braking device 10*a, b, c* can be used as intended to brake the vehicle 1 from a driving speed of, for example, greater than 20 km/h to a standstill.

The braking torque paths 100*a, b, c* each run via the transmission gearing 4, wherein the braking device 10*a, b, c* is arranged in front of the transmission gearing 4 with respect to the respective braking torque path 100*a, b, c* in the torque flow direction of the braking torque.

In the first exemplary embodiment, the braking device 10*a* is arranged in the braking torque path 100*a* in front of the electric drive unit 3. The braking torque path 100*a* thus runs from the braking device 10*a*, which generates the braking torque, via the electric drive unit 3, subsequently via the transmission gearing 4 and at least one driven wheel 7.

In the second exemplary embodiment, the braking device 10*b* is arranged in the drive torque path 103 between the drive unit 3 and the transmission gearing 4. The braking torque path 100*b* thus runs from the braking device 10*b*, which generates the braking torque, via the transmission gearing 4 to the at least one driven wheel 7. The drive unit 3 is arranged outside the braking torque path 100*b*.

In the third exemplary embodiment, the braking device 10*c* is arranged in the braking torque path 100*c* with respect to the transmission gearing 4 on a different axial side than the drive unit 3. The braking torque path 100*c* thus runs from the braking device 10*c*, which generates the braking torque, via the transmission gearing 4 to the at least one driven wheel 7. The drive unit 3 is arranged outside the braking torque path 100*c*.

What the three positions of the braking device 10*a, b, c* have in common is that the braking device 10*a, b, c* is operated at the engine speed of the drive unit 3 or at least at a speed that is not generated via the transmission gearing 4.

The braking devices 10*a, b, c* each have a brake coupling device 39*a, b, c*, which enables the respective braking device 10*a, b, c* to be decoupled from the drive torque path 103 and/or from the respective braking torque path 100*a, b, c*. The brake coupling device 39*a, b, c* is designed, for example, as a synchronization device, such that the brake coupling device 39*a, b, c* can be selectively set to a coupling state or to a freewheel state. In the coupling state, the braking device is in a braking readiness state and the braking device 10*a, b, c* is coupled and rotates ready to brake. In the release state, the braking device 10*a, b, c* is disengaged, such that any drag torques caused by rotating masses of the braking device 10*a, b, c* are reduced.

In addition to the braking device 10*a, b, c*, the vehicle 2 optionally has a service brake 16, wherein the service brake 16 comprises a friction brake 17, which is designed, for example, close to the wheel as a disc brake or as a drum brake. The vehicle 2 optionally has a recuperation brake 18, which is implemented by the drive unit 3 in a generator mode. The recuperation brake 18 can be combined with, but also independent of, the service brake 16.

With the service brake 16, the vehicle 2 has an approved deceleration system. The braking device 10*a, b, c* is designed, for example, as a complementary brake and/or as a supplementary braking device to the service brake 16, which does not perform any safety-relevant functions but rather a comfort function with regard to the braking of the vehicle.

The drive assembly 1 optionally has a brake management device 19, wherein the brake management device 19 is designed to control the service brake 16, the optional recuperation brake 18 and the braking device 10. The brake management device 19 can be designed, for example, as a digital data processing device and/or as an analog switching device. The brake management device 19 is designed to control the service brake 16 and in particular the friction brake 17 in an emergency braking state when a high braking deceleration is required, such that the latter takes over the main braking deceleration. This ensures that, in the emergency braking state, the safety-relevant service brake 16 implements the emergency braking.

Furthermore, the brake management device 19 is designed to implement the braking deceleration by the recuperation brake 18 in a recuperation braking state. This improves the energy management of the vehicle 2.

The brake management device 19 is designed to control the braking device 10*a* and the service brake 16 in a comfort braking state such that the main braking deceleration is carried out primarily or exclusively by the braking device 10*a, b, c*. For example, the brake management device 19 is designed, in particular, to implement the comfort braking state when braking the vehicle at lower speeds below 20 km/h, in particular less than 10 km/h, without the service brake 16, in particular without the friction brake 17 and/or exclusively by means of the braking device 10. Optionally, the recuperation brake 18 can support the comfort braking state.

The braking device 10*a, b, c* is designed in particular as a wet, in particular wet-running braking device 10*a, b, c*. The braking device 10*a, b, c* can have a multi-disc brake 41. The wet-running property ensures that virtually no acoustic emissions are generated in the braking state of the braking device 10*a, b, c*. The significant or even exclusive use of the braking device 10*a, b, c* increases comfort and thus improves operating characteristics. The background to this braking strategy of the comfort braking state is that in the slow speed states the recuperation brake 18 no longer works effectively, while at the same time the use of the acoustically disadvantageous friction brake 17 is avoided.

Alternatively or additionally, the brake management device 19 is designed to monitor the brake coupling device 39*a, b, c* and to control the freewheel state or the braking readiness state/coupling state.

Optionally, the drive assembly 1 additionally has a temperature management device 20, wherein the temperature management device 20 is designed to supply the braking heat generated in the wet-running braking device 10 in a temperature control fluid of the braking device 10 to an additional function in the vehicle 2. In the useful function, the braking heat can be used, for example, to heat up the transmission gearing, to control the temperature of the battery and/or to control the temperature of the passenger compartment. In particular, the mixed use of the braking device 10*a, b, c* in conjunction with the recuperation brake 18 is intended. This mixed use leads to low energies that must be converted during the braking process. By means of pumps, the temperature control fluid is pumped to other locations in the vehicle 2 and can be used, for example, to heat up the gearing, to control the temperature of the battery and to control the temperature of the passenger compartment. This increases the energy efficiency of the vehicle 2 by making use of energy that was previously dissipated, unused, into the environment.

The temperature management device 20 can be designed to advantageously distribute the braking heat generated during normal driving operation. In this embodiment, the braking device 10*a, b, c* is used as a passive heating device.

It is also possible to use the braking device 10*a, b, c* as a "friction heater" during driving operation and/or as an active heating device: For this purpose, the braking device 10*a, b, c* designed as a wet multi-disc brake 41 actively serves to generate temperature by generating a braking torque which generates thermal energy. However, the braking torque is simultaneously compensated by an increase in the engine torque of the drive unit 3 in order to keep the speed of the vehicle constant. In the active heating state, the braking device 10*a, b, c* and the drive unit 3 work against each other to actively generate braking heat.

It is also possible to use the braking device 10*a, b, c* as an active auxiliary heater: in this case, the temperature management device 20 controls the drive coupling device 40*a, b*, in particular when the vehicle 1 is at a standstill, in order to disconnect the drive torque path 103. Furthermore, the drive unit 3 is controlled to generate a drive torque which is passed to the braking device 10*a, b, c*. In addition, the braking device 10*a, b, c* is triggered to carry out braking in order to cancel the drive torque by the braking torque, such that braking heat is actively generated when the vehicle 2 is stationary. The braking heat can be used for the useful functions already described.

The drive coupling device 40*a, b* makes it possible to operate the drive unit 3 independently of the driving state, i.e., even when stationary (similar to idling in a combustion engine). This makes it possible to continue operating the braking device 10*a, b, c*, which is coupled to the drive unit 3, and thus to generate braking heat, which can subsequently be used, for example, to heat the battery and the interior or for other useful functions. This means that the system can also be operated as an auxiliary heater when the vehicle is at a standstill. No additional or fewer additional heating components are required.

The positioning of the braking device 10*a, b, c* in front of the transmission gearing 4 is advantageous because it can be controlled directly with the engine speed. In typical applications, this allows for higher speeds at lower torques.

Optionally, the vehicle 2 has a vibration management device 38, wherein the vibration management device 38 is designed to compensate and/or dampen vibrations in the drive assembly 1, in the drive torque path 103, in the braking torque path 100, in the drive unit 3, in the transmission gearing 4 and/or in the vehicle 2—collectively referred to as the system—by monitoring, in particular controlling, the braking device 10*a, b, c*.

The vibration management device 38 can detect the vibrations to be dampened by means of suitable sensors. Examples of sensors are vibration sensors, speed sensors, acoustic sensors, etc. The braking device 10*a, b, c* is controlled on the basis of the detected vibrations to be dampened. In particular, the control takes place independently of any control as a brake during driving operation.

The vibration damping function can be implemented by controlling the multi-disc brake 41, i.e., the actual brake actuator. The control can generate damping and/or counter-vibration in order to compensate and/or dampen the vibration to be damped. In particular, active vibration damping is implemented.

Alternatively or additionally, the vibration damping function can be implemented by controlling the brake coupling device 39*a, b, c* by switching it from the freewheel state to the braking readiness state/coupling state. In this case, a damping component is activated in the vibrating system by the multi-disc brake 41 running in the temperature control fluid, such that damping is implemented. In the event that the brake coupling device 39*a, b, c* is designed as a synchronization device, the brake coupling device 39*a, b, c* can also be controlled in a sliding or frictional manner and thus in an intermediate state between the release state and the braking readiness state. This enables a gradual damping and/or compensation of the vibration to be damped by the vibration management device 38.

If the effect on the vibration to be damped is considered as a detuning of the system to be damped, a first possibility of detuning is achieved by switching on and/or synchronizing. As a result, the rotatable part of the multi-disc brake 41 is coupled to the drive unit 3, wherein the additional mass detunes the system.

Alternatively or additionally, in particular after the rotatable part of the multi-disc brake 41 has been coupled, the latter can be closed, wherein the system can be detuned in a fully variable manner.

Figure 2A:
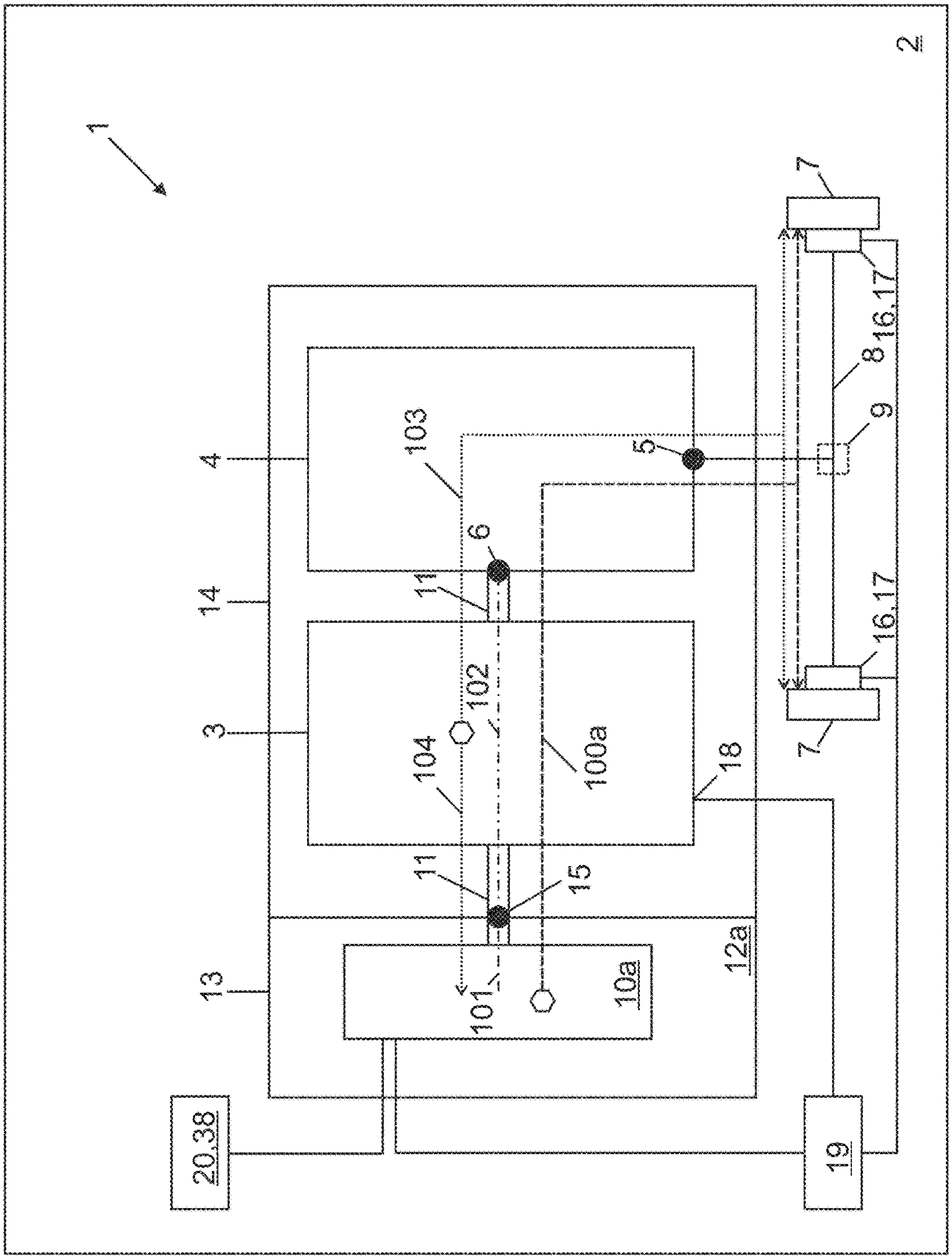
FIGS. 2*a, b, c* each show a block diagram for a first, a second and a third exemplary embodiment.

FIG. 2*a* shows the first exemplary embodiment with the braking device 10*a* in a schematic, alternative representation.

The drive unit 3 has a rotor shaft 11, wherein the rotor shaft 11 is rotationally coupled and/or rotationally fixedly connected to the braking device 10*a* and forms a transmission shaft. In the exemplary embodiment shown in FIG. 2*a*, a brake rotational axis 101 is aligned coaxially to a rotor rotational axis 102 of the rotor shaft 11. The braking device 10*a* is permanently rotationally coupled and/or rotationally fixedly connected to the rotor shaft 11, at least in the braking readiness state. On an axial side of the rotor shaft 11 opposite the braking device 10*a*, the latter is connected to the gearing input 6 of the transmission gearing 4 for rotation therewith. Thus, the rotor shaft 11 and thus the drive unit 3 are operatively connected to the braking device 10*a* on one axial side and to the transmission gearing 4 on the other axial side. This positioning enables a particularly simple integration and design of the braking device 10*a* and/or the drive assembly 1. The braking torque path 100*a* thus runs from the braking device 10*a* via the drive unit 3, the transmission gearing 4 to the gearing output 5.

The drive assembly 1 has the additional module 12*a*, wherein the additional module 12*a* has a module housing 13, wherein the braking device 10*a* is arranged in the module housing 13. The drive assembly 1 further comprises a main housing 14, wherein at least the drive unit 3 and optionally additionally the transmission gearing 4 are arranged in the main housing 14. The additional module 12*a* and/or the module housing 13 is detachably connected to the main housing 14. Thus, the additional module 12*a* can be easily coupled to the main housing 14 and thus to the electric drive unit 3 for maintenance or retrofitting purposes.

Furthermore, a drive torque counter-path 104 is formed, which runs in particular in the opposite direction to the drive torque path 103 and runs from the electric drive unit 3 via the rotor shaft 11 into the additional module 12*a* and/or into the braking device 10*a*. For this drive torque counter-path 104, the additional module 12*a* and/or the braking device 10*a* forms a dead-end module and/or an end point. In particular, the additional module 12*a* and/or the braking device 10*a* has only a single and/or common torque interface 15, which is designed as an output for the braking torque and/or as an input for the drive torque from the drive unit 3.

Optionally, the vehicle 2 can additionally have the drive coupling device 40*a, b*. This and the brake coupling device 39*a* are not shown for graphic reasons.

The brake management device 19 is connected in terms of signaling to the optional recuperation brake 18, the braking device 10*a* and the service brake 16. The temperature management device 20 is connected in terms of signaling to the braking device 10*a* and optionally additionally to the drive coupling device 40*a, b* or in another design and/or to the drive unit 3. The vibration management device 38 is connected to the braking device 10*a* in terms of signaling.

Figure 2B:
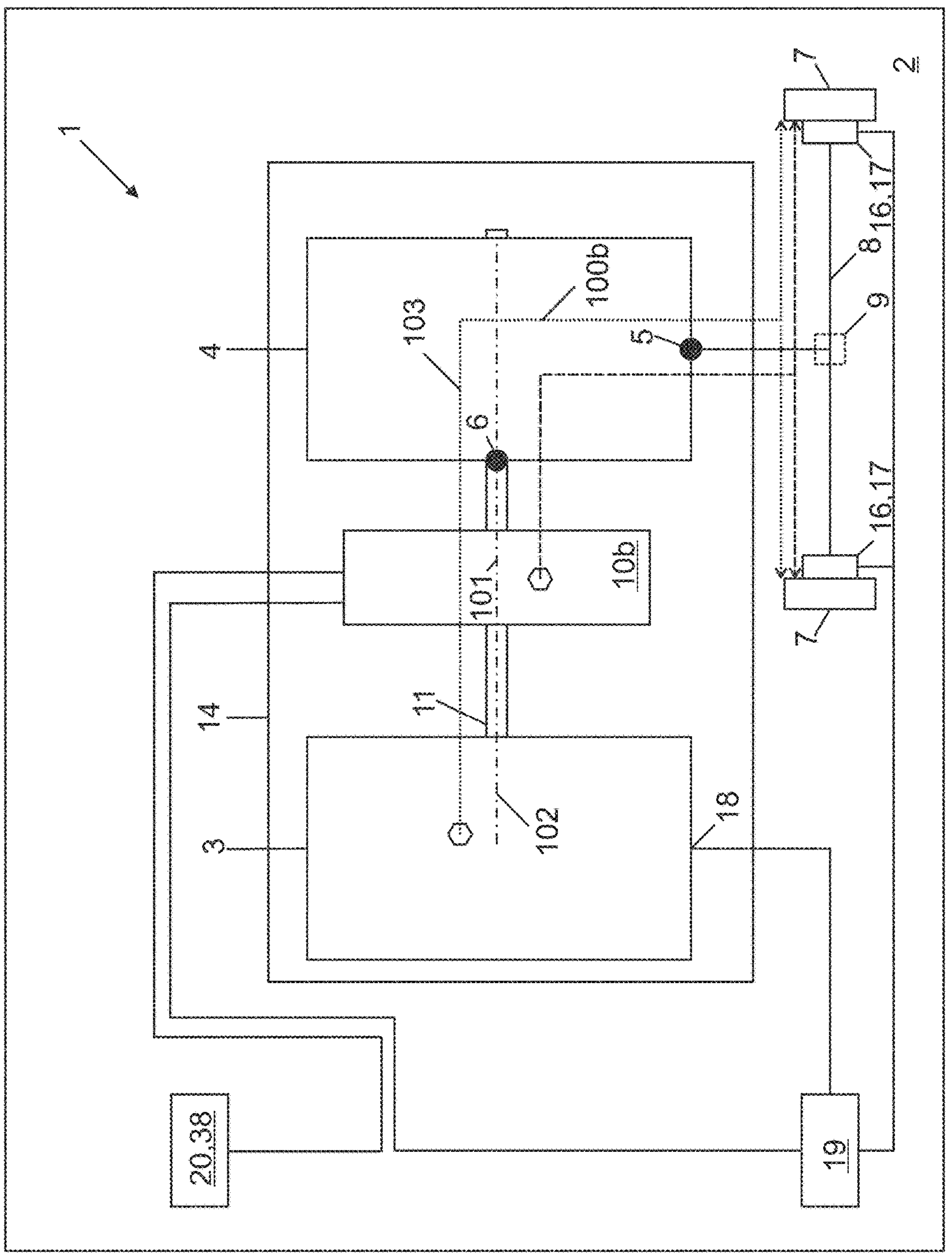

FIG. 2*b* shows the second exemplary embodiment with the braking device 10*b* in a schematic, alternative representation.

The drive unit 3 has the rotor shaft 11, wherein the rotor shaft 11 is rotationally coupled and/or rotationally fixedly connected to the braking device 10*b*. In the exemplary embodiment shown in FIG. 2*b*, a brake rotational axis 101 is aligned coaxially to a rotor rotational axis 102 of the rotor shaft 11. The braking device 10*b* is permanently rotationally coupled and/or rotationally fixedly connected to the rotor shaft 11, at least in the coupling state/braking readiness state. The braking device 10*b* is arranged with respect to the drive torque path 103 after the drive unit 3 and before the transmission gearing 4. For example, the braking device 10*b* can be integrated into the main housing 4. This positioning enables a particularly compact integration and design of the braking device 10*b* and/or the drive assembly 1. The braking torque path 100*b* thus runs from the braking device 10*b* via the transmission gearing 4 to the gearing output 5.

Optionally, the vehicle 2 can additionally have the drive coupling device 40*b* or another drive coupling device. This and the brake coupling device 39*b* are not shown for graphic reasons.

The brake management device 19 is connected in terms of signaling to the optional recuperation brake 18, the braking device 10*b* and the service brake 16. The temperature management device 20 is connected in terms of signaling to the braking device 10*b* and optionally additionally to the drive coupling device 40*b* or in another design and/or to the drive unit 3. The vibration management device 38 is connected to the braking device 10*a* in terms of signaling.

Figure 2C:
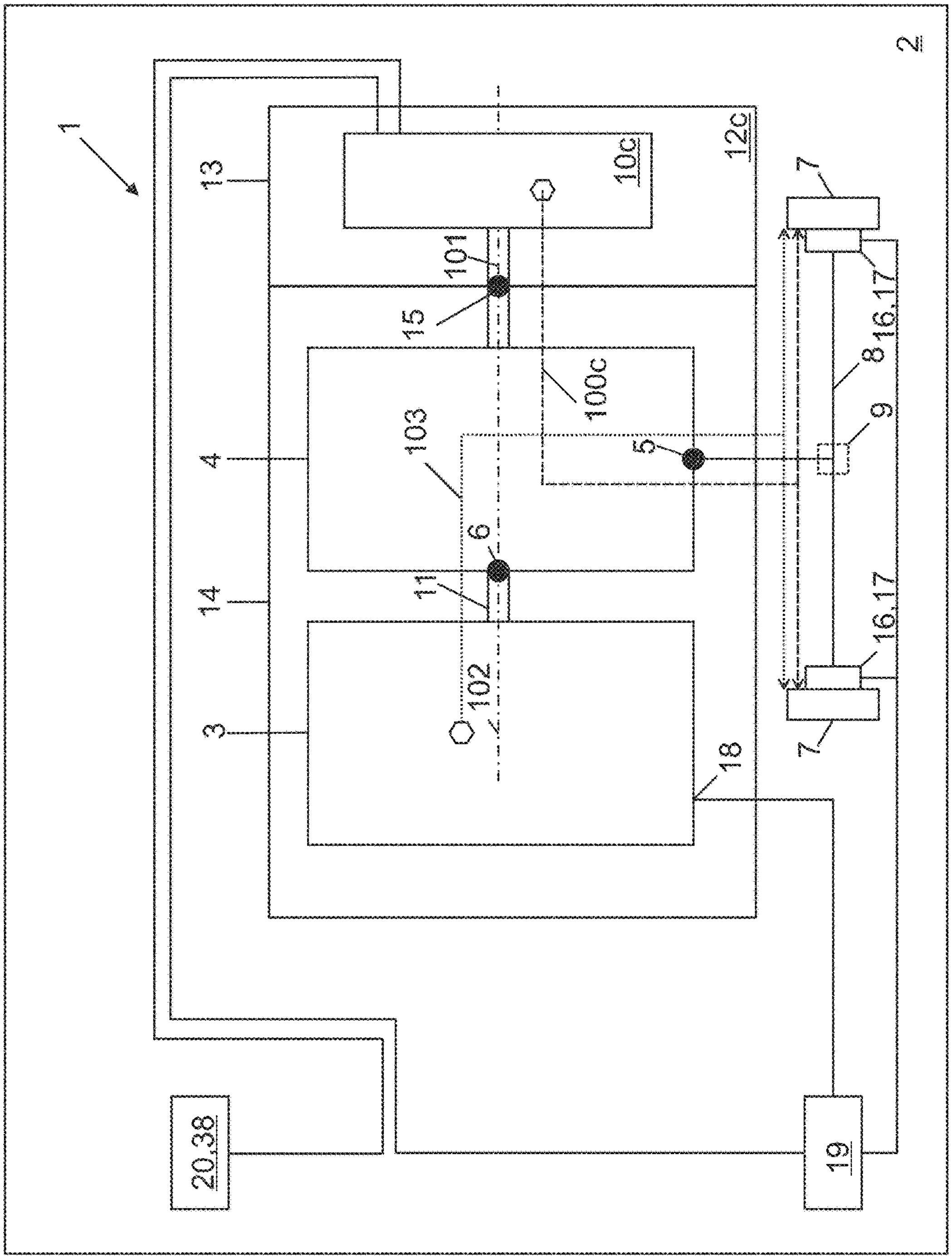

FIG. 2 *c* shows the third exemplary embodiment with the braking device 10*c* in a schematic, alternative representation.

The drive unit 3 has the rotor shaft 11, wherein the rotor shaft 11 is rotationally coupled and/or rotationally fixedly connected, via the transmission gearing 4, to the braking device 10*a*. In the exemplary embodiment shown in FIG. 2*c*, the brake rotational axis 101 is aligned coaxially to a rotor rotational axis 102 of the rotor shaft 11. The braking device 10*c* is permanently rotationally coupled and/or rotationally fixedly connected to the rotor shaft 11, in the braking readiness state. The transmission gearing 4 is arranged between the drive unit 3 and the braking device 10*c* with respect to the rotor rotational axis 102 and/or the brake rotational axis 101. Thus, the transmission gearing 4 is operatively connected with one axial side to the drive unit 3 and with the other axial side to the braking device 10*c*. In particular, the braking device 10*c* rotates at the speed of the drive unit 3.

This positioning enables a particularly simple integration and design of the braking device 10*c* and/or the drive assembly 1. The braking torque path 100*c* thus runs from the braking device 10*c* via the transmission gearing 4 to the gearing output 5.

The drive assembly 1 has the additional module 12*c*, wherein the additional module 12*c* has a module housing 13, wherein the braking device 10*a* is arranged in the module housing 13. The drive assembly 1 further comprises the main housing 14, wherein at least the transmission gearing 4 and optionally additionally the drive unit 3 are arranged in the main housing 14. The additional module 12*c* and/or the module housing 13 is detachably connected to the main housing 14. Thus, the additional module 12*c* can be easily coupled to the main housing 14 and thus to the transmission gearing 4 and/or the electric drive unit 3 for maintenance or retrofitting purposes.

Furthermore, a drive torque branch path 105 is formed, which branches off from the drive torque path 103 and runs from the electric drive unit 3 via the transmission gearing 4 into the additional module 12*c* and/or into the braking device 10*d*. For this drive torque branch path 105, the additional module 12*c* and/or the braking device 10*c* forms a dead-end module and/or an end point. In particular, the additional module 12*c* and/or the braking device 10*c* has only a single and/or common torque interface 15, which is designed as an output for the braking torque and/or as an input for the drive torque from the drive unit 3 and/or the transmission gearing.

Optionally, the vehicle 2 can additionally have the drive coupling device 40*a, b*, and other drive coupling devices. This and the brake coupling device 39*a* are not shown for graphic reasons.

The brake management device 19 is connected in terms of signaling to the optional recuperation brake 18, the braking device 10*c* and to the service brake 16. The temperature management device 20 is connected in terms of signaling to the braking device 10*c* and optionally additionally to the drive coupling device 40*a, b* or in another design and/or to the drive unit 3. The vibration management device 38 is connected to the braking device 10*c* in terms of signaling.

Figure 3:
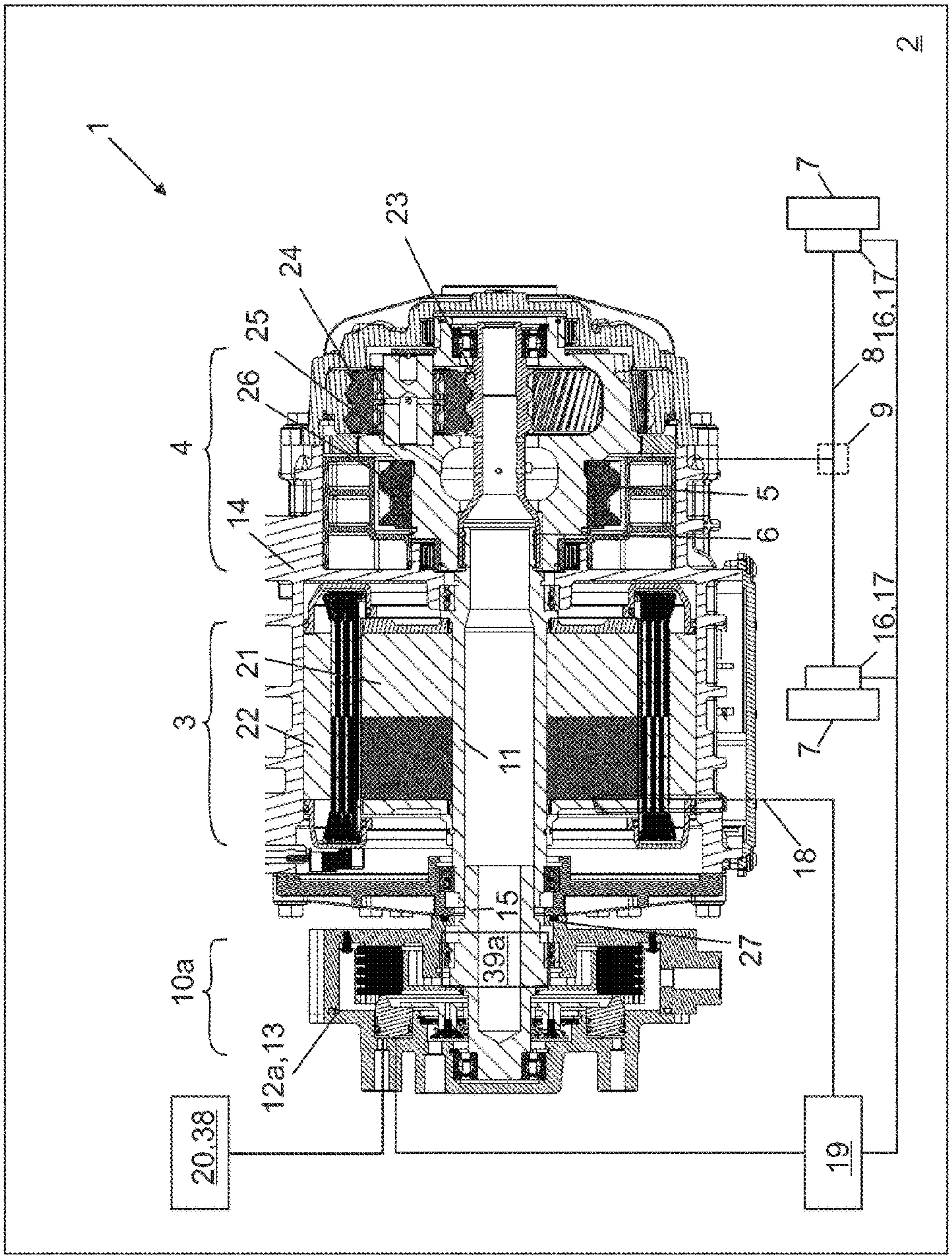
FIG. 3 shows a possible structural design of the drive assembly according to the first embodiment.

FIG. 3 shows a schematic longitudinal section through a structural design of the drive assembly 1 according to the first exemplary embodiment of the invention, wherein the same components and areas are provided with the same reference numerals as in FIG. 1, such that reference is made to the previous description and only the structural details are discussed below. For the torque paths, reference is also made to the previous figures.

The centrally arranged electric drive unit 3 has a rotor 21 which is connected in a rotationally fixed manner to the rotor shaft 11. A stator 22 of the electric drive unit 3, however, is arranged in the main housing 14 in a stationary manner.

The transmission gearing 4 is designed as a planetary gearing, wherein the rotor shaft 11 in the gearing input 6 is connected to a sun shaft 23, which meshes with a plurality of planetary gears 24, which are rotatably arranged in a planetary carrier 25 on a common pitch circle. The planetary carrier 25 forms the gearing output 5 and has, for example, a circumferential spur gear toothing 26. The transmission gearing 4 is arranged together with the electric drive unit 3 in the main housing 14. An area of the drive assembly 1 in which the power electronics for the drive unit 3 are arranged is cut off graphically.

On the left side, the braking device 10*a* can be seen in the additional module 12*a*. The additional module 12*a* has the module housing 13, wherein the additional module 12*a* and/or the module housing 13 is detachably connected to the main housing 14 via screw connections 27. The braking device 10*a* has the brake coupling device 39*a*, which is only indicated schematically.

Figure 4:
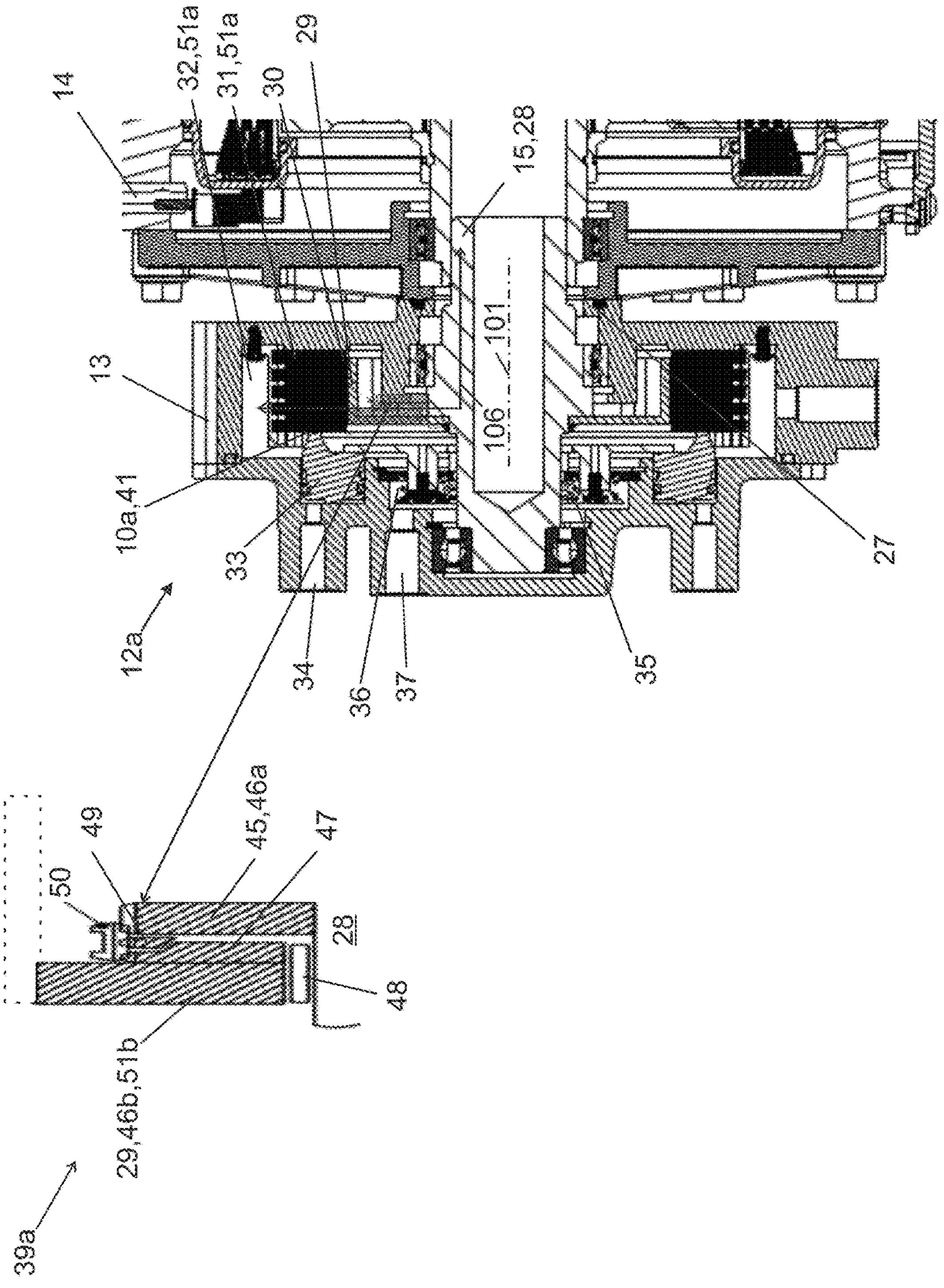
FIG. 4 shows a possible structural design of a braking device for the drive assembly as an exemplary embodiment.

FIG. 4 shows a detailed representation of the additional module 12*a* designed as a low-energy brake from FIG. 3. The braking device 10*a* is connected to the engine shaft via an input shaft 28, which forms the torque interface 15, as the rotor shaft 11 (FIG. 2) of the electric drive unit 3 via the brake coupling device 39*a*. The torque transmission can, for example, take place via gearing on the input shaft 28 with corresponding counter-toothing on the engine shaft/rotor shaft 11 (FIG. 3).

The brake coupling device 39*a* is arranged on the input shaft 23, wherein the brake coupling device 39*a* forms a synchronization device. The brake coupling device 39*a* is shown again in enlarged detail in FIG. 4. The brake coupling device 39*a* has a synchronizing body 45, wherein the synchronizing body 45 is arranged in a rotationally fixed manner on the input shaft 28 and rotates therewith. The synchronizing body 45 forms a coupling partner 46*a*, of the brake coupling device 39*a*. The brake coupling device 39*a* has a loose body 47, wherein the loose body 47 forms another coupling partner 46*b* of the brake coupling device 39*a*. The loose body 47 is rotatably mounted on the input shaft 28 via a bearing device 48, which forms a component of the brake coupling device 39*a*. This can be designed, for example, as a ball bearing, angular ball bearing or axial needle bearing. A synchronizer ring 49 is arranged between the synchronizing body 45 and the loose body 47, wherein the synchronizer ring 49 enables synchronization of the rotational speed between the loose body 47 and the synchronizing body 45 and/or between the clutch partners 46*a, b*. The brake coupling device 39*a* is aligned and/or arranged coaxially to the brake rotational axis 101. The brake coupling device 39*a* has a shift collar 50 which is arranged coaxially to the brake rotational axis 101 and/or the brake coupling device 39*a*. The shift collar 50 can be moved in an axial direction in relation to the brake rotational axis 101. The actuation of the shift collar 55 of the brake coupling device 39*a* can, for example, be carried out by means of a shift fork, via a hydraulic piston or by means of electromechanical actuation. The shift collar 55 has a toothing extending in the axial direction, which can engage in a form-fitting manner in counter-toothings of the synchronizing body 45 and the loose body 47 and/or the coupling partners 46*a, b* and can form a form-fitting connection with the same in the direction of rotation about the brake rotational axis 101.

In a release state, the shift collar 50 is only connected in a form-fitting manner to the loose body 47 in the direction of rotation, the synchronizing body 45 is rotationally decoupled for this purpose. In a coupling state, the shift collar 50 is connected in a form-fitting manner to both the loose body 47 and the synchronizing body 45 in the direction of rotation, such that the loose body 47 and the synchronizing body 45 are connected in a form-fitting manner to one another in the direction of rotation via the shift collar 50.

During a transition from the release state to the coupling state, the shift collar 50 carries the synchronizer ring 49 with it in the axial direction such that this presses against the synchronizing body 45 and, through the frictional contact, adjusts the speed of the loose body 47 to the speed of the synchronizing body 45 and thus synchronizes the speeds.

Due to the form-fitting engagement of the shift collar 50 in the coupling partner(s) 46*a, b*, the brake coupling device 39*a* is in an actuation force-free state both in the release state and in the coupling state, such that no energy has to be expended to maintain the respective state. The idea is that no further axial force is required in the actuated state. Axial force is only required for synchronization; in the engaged state, the system can be switched in a force-free manner, since the torque is transmitted by the form-fitting connection.

The braking device 10*a* has an inner ring 29, wherein the inner ring 29 is connected to the loose body and/or to the other coupling partner 26*b* for rotation therewith. Alternatively, it is also possible to integrate both components into a single component. The torque is transmitted via the inner ring 29 to a plurality of friction discs 30, which form an inner disc pack. For this purpose, a toothing is introduced into the inner diameter of the friction discs 30. To generate the braking torque, the friction discs 30 are pressed against a plurality of steel discs 31, which form an outer disc pack. The outer disc pack forms a first braking partner 51*a*, the inner disc pack forms a second braking partner 51*b* of the multi-disc brake 41. The steel discs 31 are secured against rotation by means of an external toothing in a toothed outer ring 32 but are mounted so as to be axially displaceable. The support of the braking torque runs via the toothed outer ring 32 over the module housing 13 into the main housing 14, wherein the transmission of the torque can be realized, for example, by a screw connection, toothing or the like. The screw connections 27 are shown.

The axial force required to generate the braking torque can, for example, be achieved by means of hydraulic pressure. Another possibility is to generate the axial force by means of an electric drive. For this purpose, an annular gap is formed in the module housing 13, in which a piston 33 is arranged so as to be axially displaceable. The annular gap is sealed by sealing rings arranged on the inner and outer diameters; pressure can be built up. Optional sliding bands can be used to guide the piston. If hydraulic pressure is built up, the piston 33 is displaced against the steel disc 31; the required axial force is built up. The hydraulic fluid required to build up pressure is fed into the annular pressure chamber via boreholes 34 in the module housing 13.

If no deceleration is requested and the system is in an unpressurized state, the piston 33 is pressed into its initial position by springs 35. Spring plates are used to transmit force between springs 35, module housing 13 and piston 33. The module housing 13 can be constructed from two housing halves as shown, wherein the connection of the housing halves must be able to support the axial force required to generate the braking torque. A seal is arranged between the two housing halves; this is designed as an O-ring, for example. This forms a module interior 36, wherein the temperature control fluid for controlling the temperature of and lubricating the friction discs 30 and the steel discs 31 is arranged in the module interior 36. The temperature control fluid can be connected to a temperature control circuit via further boreholes 37, such that the braking heat generated during braking can be dissipated with the temperature control fluid and the braking heat can be fed to the useful functions.

Figure 5:
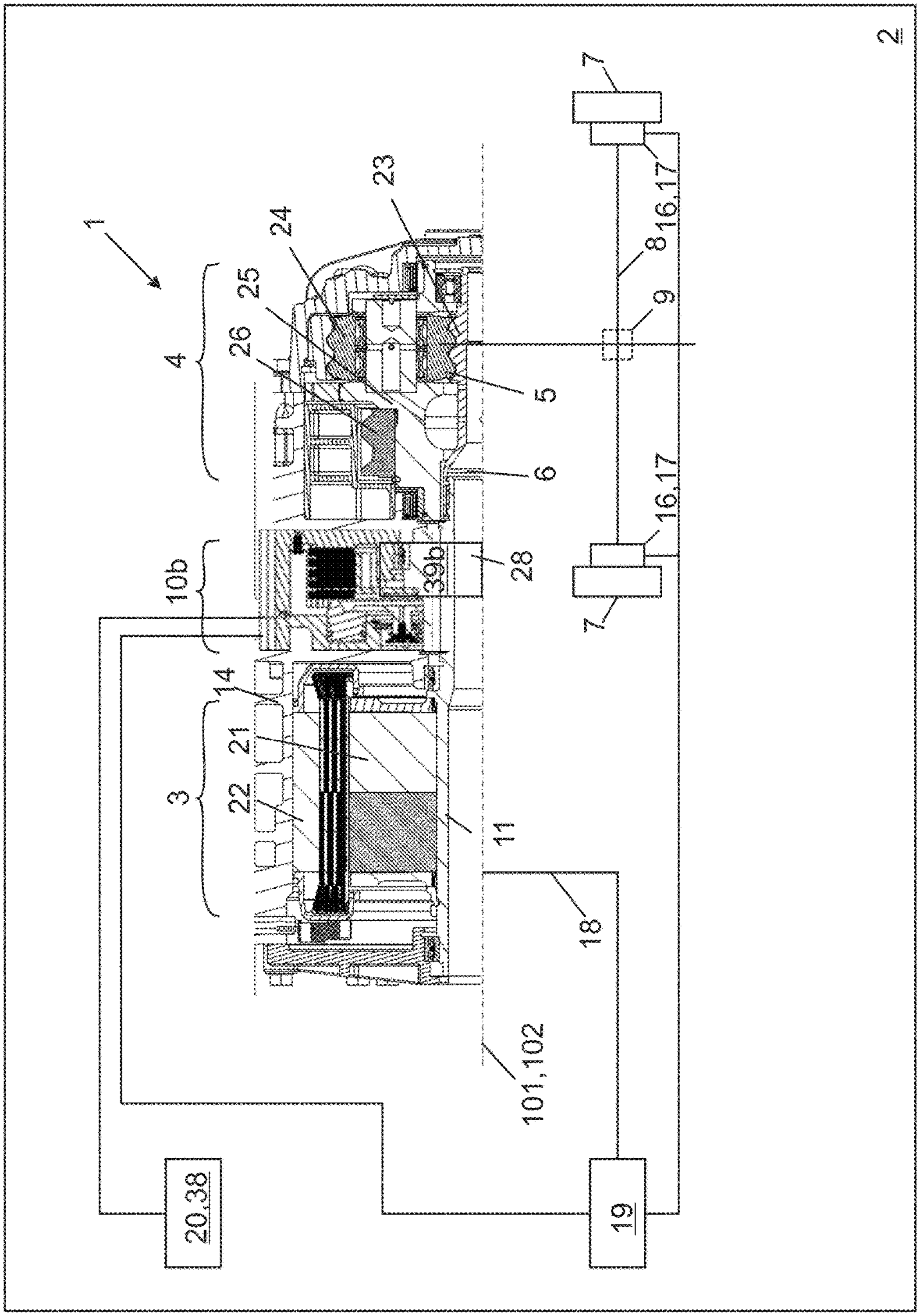
FIG. 5 shows a possible structural design of the drive assembly according to the second embodiment.

In this exemplary embodiment, the other coupling partner 46*b* of the brake coupling device 39*a* is connected to the second braking partner 51*b* of the multi-disc brake 41, as an example of a brake of the braking device 10*a*, for rotation therewith. The coupling partners 46*a* is connected to the input shaft 28 for rotation therewith. A torque path 106 of the braking device 10*a* runs via the input shaft 28, the brake coupling device 39*a* and the multi-disc brake 41 and can be opened or separated by the brake coupling device 39*a* in the release state and closed in the coupling state. The torque path of the braking device 39*a* is designed as a dead-end path FIG. 5 shows a schematic longitudinal section through a structural design of the drive assembly 1 according to the second exemplary embodiment of the invention, wherein the same components and areas are provided with the same reference numerals as in FIG. 1, such that reference is made to the previous description and only the structural details are discussed below. For the torque paths, reference is also made to the previous figures. For the structural details of the drive assembly 1, reference is made to the description of FIG. 3, wherein only the differences are described below. For the structural details of the braking device 10*b*, reference is made to the description of FIG. 4.

In the second exemplary embodiment, the braking device 10*b* is arranged between the drive unit 3 and the transmission gearing 4. The rotor axle 11 is connected and/or can be connected to the input shaft 28 of the braking device 10*b* for rotation therewith. The input shaft 28 is connected and/or can be connected to the gearing input 6 for rotation therewith, said gearing input being again designed as a sun shaft 23 in the second exemplary embodiment. The braking device 10*b* is integrated together with the drive unit 3 and the transmission gearing 4 into the main housing 14. The braking device 10*b* has the brake coupling device 39*b* as described in the previous figure.

Figure 6:
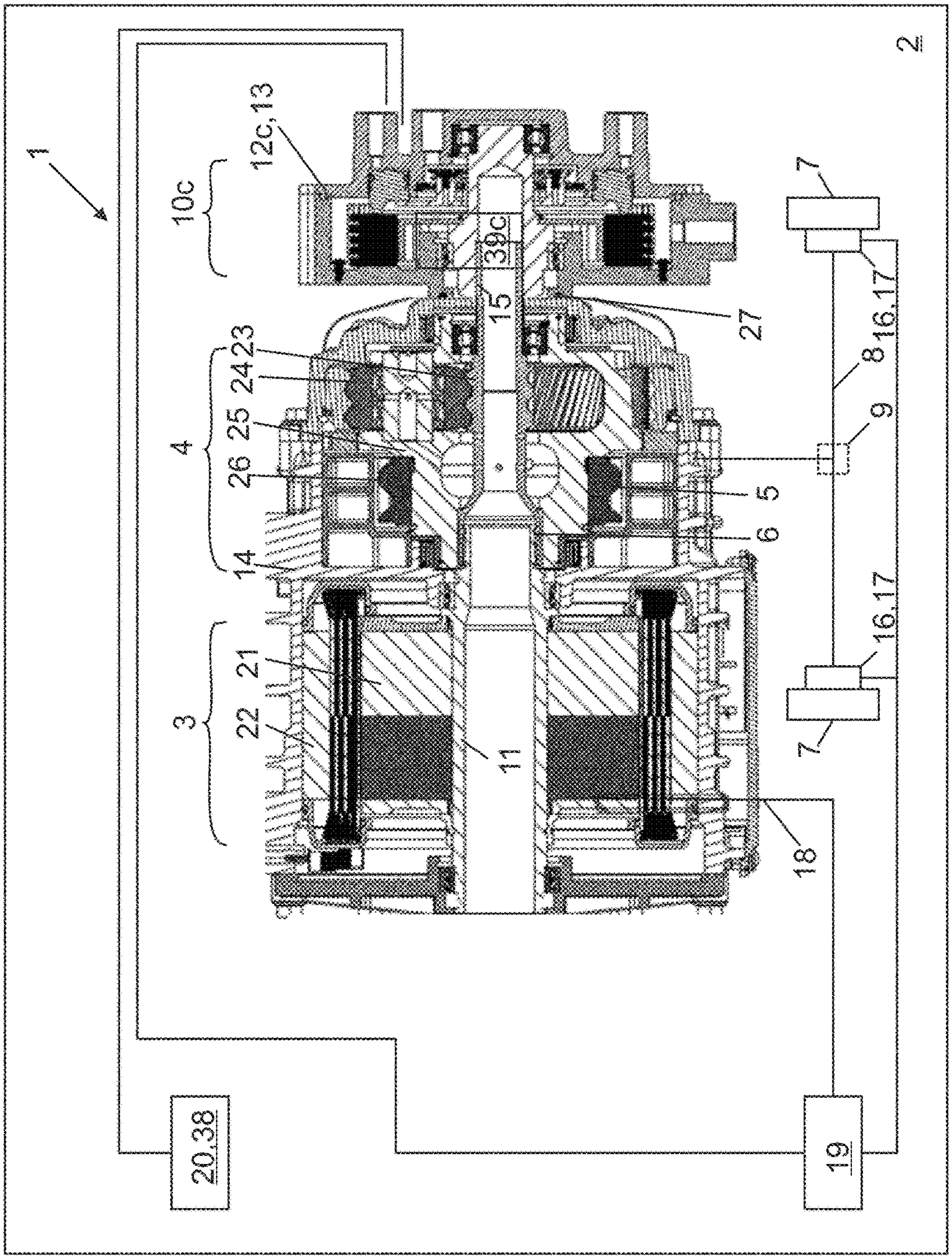
FIG. 6 shows a possible structural design of the drive assembly according to the third embodiment.

FIG. 6 shows a schematic longitudinal section through a structural design of the drive assembly 1 according to the third exemplary embodiment of the invention, wherein the same components and areas are provided with the same reference numerals as in FIG. 1, such that reference is made to the previous description and only the structural details are discussed below. For the torque paths, reference is also made to the previous figures. For the structural details of the drive assembly 1, reference is made to the description of FIG. 3, wherein only the differences are described below. For the structural details of the braking device 10*c*, reference is made to the description of FIG. 4, wherein the braking device 10*c* is designed to be structurally identical, but mirror-inverted, to the braking device 10*a*.

On the right side, the braking device 10*c* can be seen in the additional module 12*c*. The additional module 12*c* has the module housing 13, wherein the additional module 12*c* and/or the module housing 13 is detachably connected to the main housing 14 via screw connections 27. The rotor shaft 11 is connected in a rotationally fixed manner via the gearing input 6, here the sun shaft 23, and the transmission gearing 4 to the torque interface 15, here the input shaft 28. The braking device has a brake coupling device 39*c* which is identical in construction to the brake coupling device 39*a*.

Figure 7A:
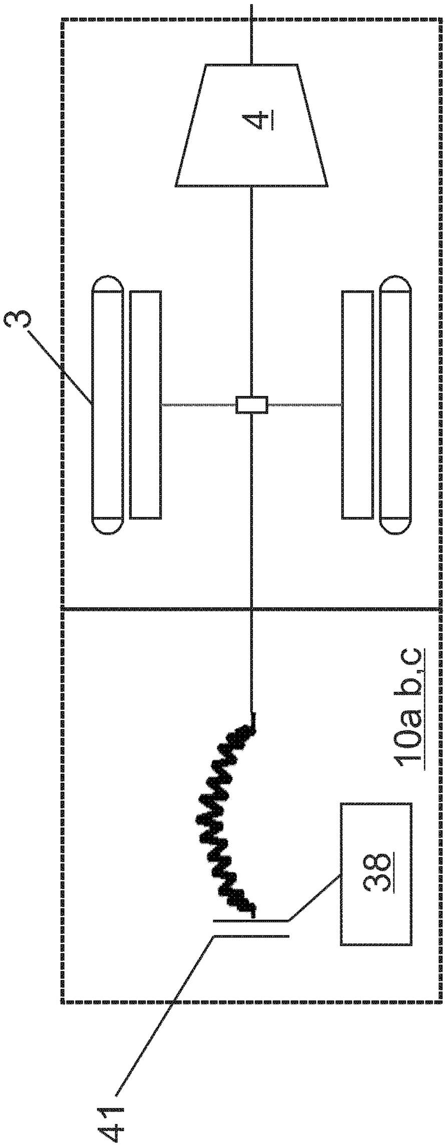
FIG. 7*a, b* shows two design variants of a method for vibration damping.

FIGS. 7*a, b* show a schematic representation of the implementation of vibration damping. The drive unit 3, the transmission gearing 4 and the braking device 10*a, b, c* are each shown.

FIG. 7*a* shows an alternative, wherein the braking device 10*a, b, c* is permanently coupled to the system comprising the drive unit 3, the transmission gearing 4 and optionally further components. The drive assembly can have a corresponding brake coupling device 39*a, b, c* on one of the other braking devices 10*a, b, c*. The vibration management device 38 controls the braking device 10*a, b, c* such that the system is detuned by the friction torque and, for example, the frequency position of any resonance frequencies is displaced. In this way, vibrations in the system can be dampened and/or compensated.

Figure 7B:
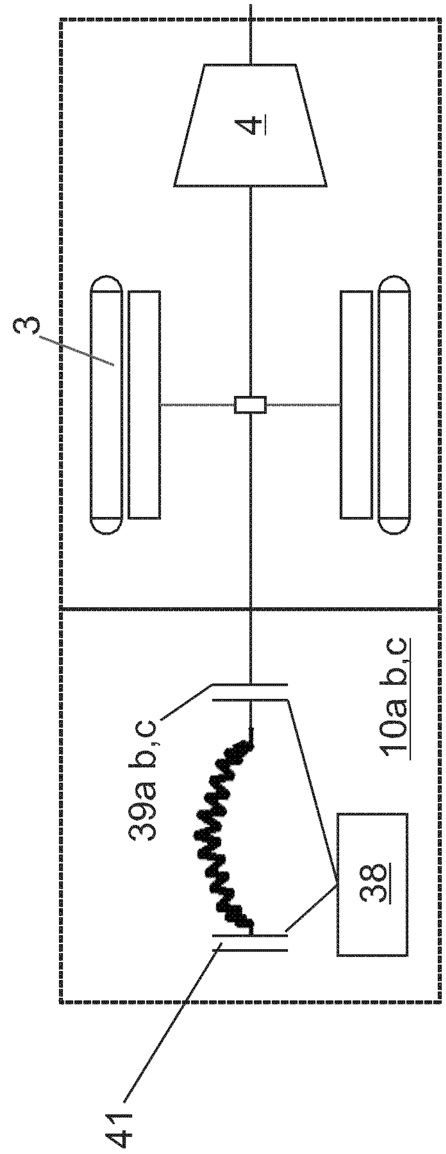

FIG. 7*b* shows a further alternative, wherein the braking device 10*a, b, c* has the brake coupling device 39*a, b, c*. A first stage of detuning is achieved by coupling the braking device 10*a, b, c* and its rotating mass. As a result, the rotatable part of the disc pack of the multi-disc brake 41 is coupled to the system. The additional mass detunes the system.

In a further step, after coupling the rotatable part of the disc pack, the disc pack and/or the multi-disc brake 41 can be closed. This allows the system to be detuned in a fully variable manner.

Figure 8:
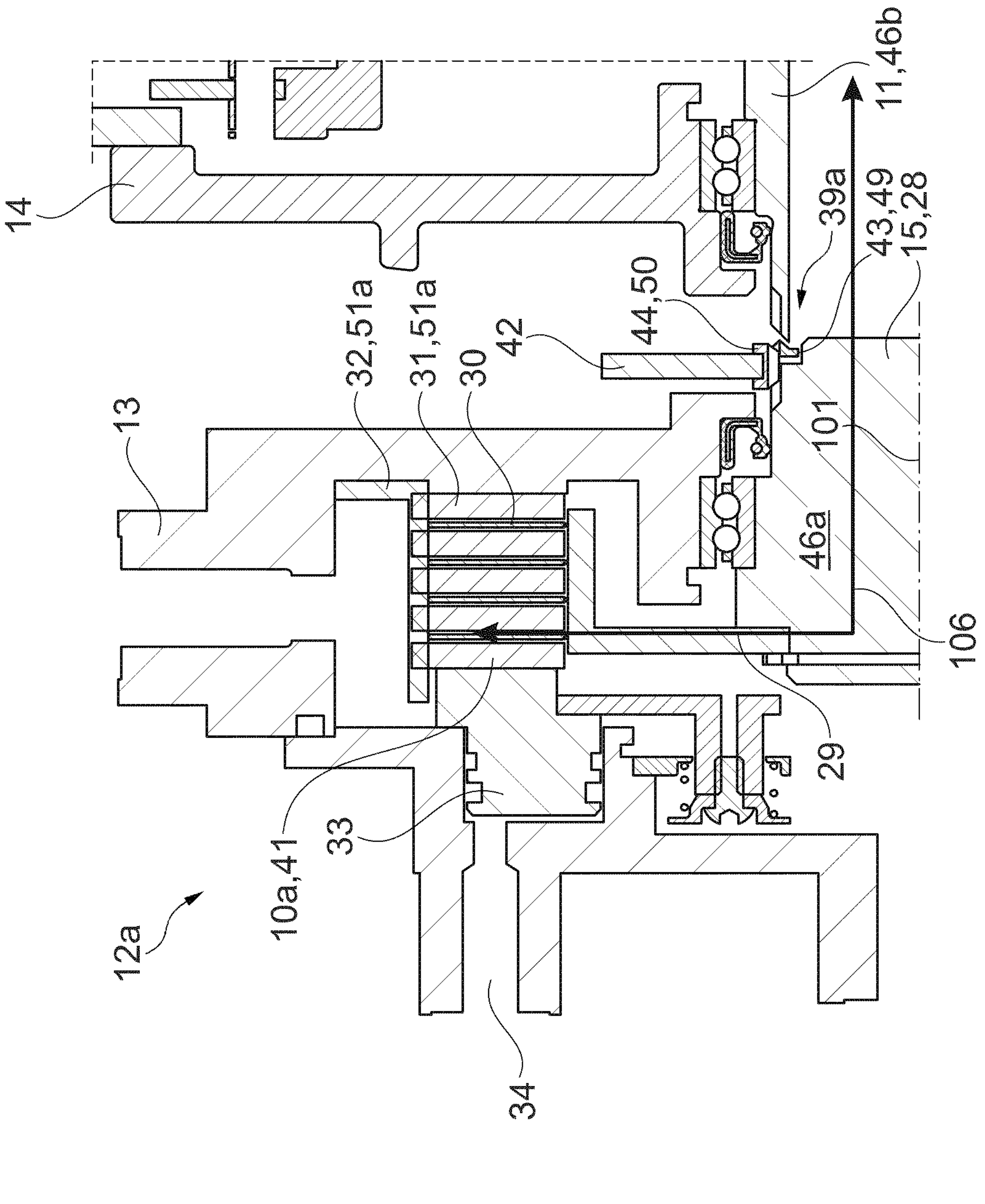
FIG. 8 shows a possible structural design of the drive assembly for vibration damping.

FIG. 8 shows the additional module 12*a* and/or the braking device 10*a* in a similar representation as in FIG. 4, wherein reference is made to the corresponding description. In contrast to FIG. 4, the drive assembly 1 and/or the vehicle 2 has the brake coupling device 39*a* in a different embodiment. The brake coupling device 39*a* is again designed as a synchronization device between the input shaft 28 and the rotor shaft 11. The set-up between the two housings is worth mentioning here. By displacing the lever 42 on a shift collar 50 in the axial direction, the speed can first be adjusted via a friction cone 43 as a synchronizer ring 49 and then a claw coupling 44 can be moved over the two shaft ends. In the arrangement shown, the claw coupling 44 is mounted on the non-permanently rotating part (not the engine side, but the friction system side). This results in less wear and less drag torque when the lever 42 engages. The brake coupling device 39*a* is controlled by the vibration management device 38. The other brake coupling device 39*c* can be designed to be structurally identical. In this exemplary embodiment, the torque path 106 runs via the brake coupling device 39*a*, the input shaft 28 into the multi-disc brake 41. In this exemplary embodiment, the torque path 106 is designed as a dead-end path in the braking device 10. The coupling partner 46*a* of the brake coupling device 39*a* is connected in a rotationally fixed manner to that of the input shaft 28; the other coupling partner 46*b* is formed by the rotor shaft 11 as a transmission shaft. The second braking partner 51*b* is connected in a rotationally fixed manner to the input shaft 28 via the inner ring 29, e.g., by means of toothing.

Figure 9:
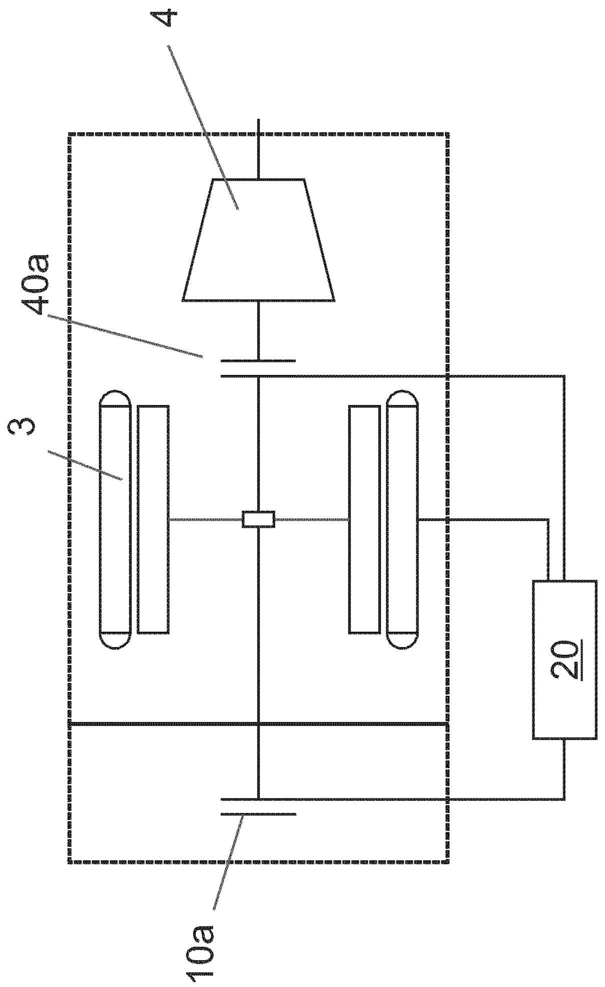
FIG. 9 shows a design variant of a method for active braking heat generation.

FIG. 9 shows a schematic block diagram of an example of the structure of an auxiliary heater for the vehicle 2. The temperature management device 20 controls the drive unit 3, the braking device 10*a* and the drive coupling device 40*a*, such that the transmission gearing 4 is separated from the drive unit 3, but the latter is in operative connection with the braking device 10*a*. Subsequently, a drive torque is generated by the drive unit 3 and directed to the braking device 10*a*, which brakes the drive torque in order to actively generate braking heat. The braking heat can subsequently be used by the temperature management device 20 to supply it to the described useful functions. The other braking devices 10*b, c* can be controlled in the same way.

Figure 10:
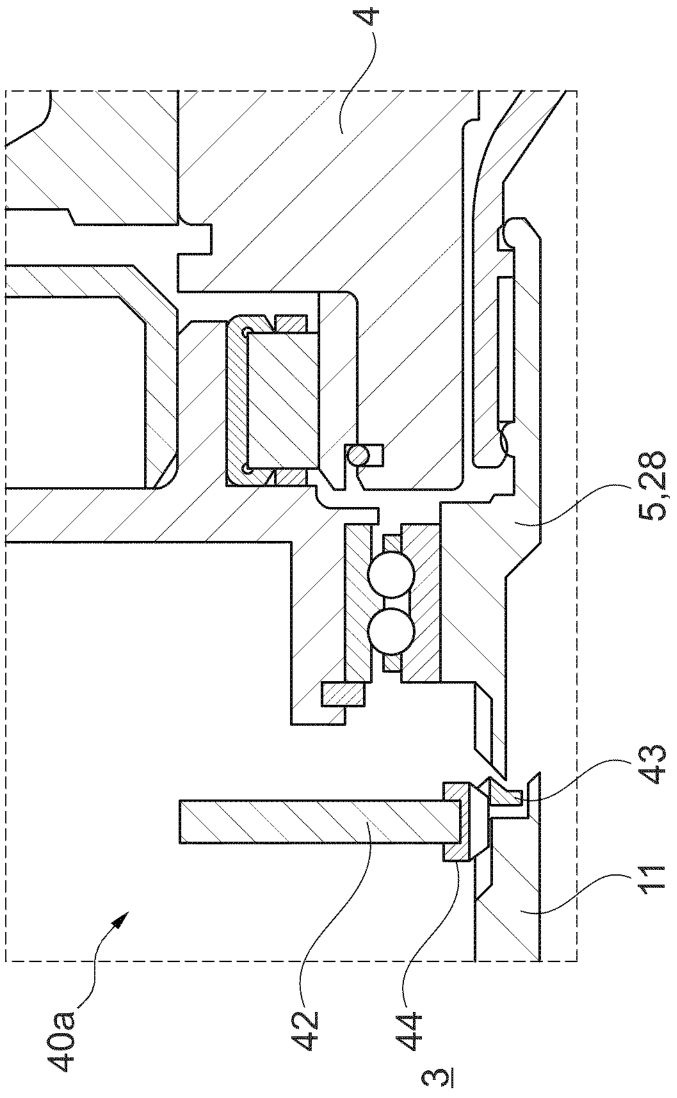
FIG. 10 shows a possible structural design of the drive assembly for braking heat generation.

FIG. 10 shows a schematic longitudinal sectional view of the drive coupling device 40*a*, which is substantially identical in construction to the brake coupling device 39*a* of FIG. 8, but in contrast to the latter, detachably connects the rotor shaft 11 to the gearing input 6 and/or the sun shaft 23. For the description of the drive coupling device 40 *a*, reference is made to FIG. 8. The positioning of the drive coupling device 40*a* in front of the transmission gearing 4 is advantageous because it can be controlled directly with the engine speed. In typical applications, this allows for higher speeds at lower torques.

| REFERENCE NUMERALS | |
|---|---|
| 1 | Drive assembly |
| 2 | Vehicle |
| 3 | Electric drive unit |
| 4 | Transmission gearing |
| 5 | Gearing output |
| 6 | Gearing input |
| 7 | Driven wheels |
| 8 | Axle |
| 9 | Differential |
| 10 | Braking device |
| 11 | Rotor shaft |
| 12a, c | Additional module |
| 13 | Module housing |
| 14 | Main housing |
| 15 | Torque interface |
| 16 | Service brake |
| 17 | Friction brake |
| 18 | Recuperation brake |

-continued

| REFERENCE NUMERALS | |
|---|---|
| 19 | Brake management device |
| 20 | Temperature management device |
| 21 | Rotor |
| 22 | Stator |
| 23 | Sun shaft |
| 24 | Planetary gears |
| 25 | Planetary carrier |
| 26 | Spur gear toothing |
| 27 | Screw connections |
| 28 | Input shaft |
| 29 | Inner ring |
| 30 | Friction discs |
| 31 | Steel discs |
| 32 | Outer ring |
| 33 | Piston |
| 34 | Boreholes for hydraulic fluid |
| 35 | Springs |
| 36 | Module interior |
| 37 | Additional boreholes |
| 38 | Vibration management device |
| 39a, b, c | Brake coupling device |
| 40a, b | Drive coupling device |
| 41 | Multi-disc brake |
| 42 | Lever |
| 43 | Friction cone |
| 44 | Claw coupling |
| 45 | Synchronizing body |
| 46a, b | Coupling partners |
| 47 | Loose body |
| 48 | Bearing device |
| 49 | Synchronizer ring |
| 50 | Shift collar |
| 51a, b | Braking partners |
| 100a, b, c | Braking torque path |
| 101 | Brake rotational axis |
| 102 | Rotor rotational axis |
| 103 | Drive torque path |
| 104 | Drive torque counter-path |
| 105 | Drive torque branch path |
| 106 | Torque path |

The invention claimed is:

1. A braking device for a drive assembly of a vehicle, comprising:

an input shaft, a brake, wherein the brake has a first braking partner and a second braking partner, wherein the first braking partner is arranged in a stationary manner in the braking device, and a brake coupling device, wherein the input shaft, the brake and the brake coupling device form sub-portions of a torque path through the braking device, wherein the brake coupling device is a synchronization device with a first coupling partner, a second coupling partner, and a shift collar, wherein, in a coupling state, the shift collar rotationally fixedly couples the first coupling partner to the second coupling partner in a form-fitting manner to close the torque path, and, in a release state, decouples the first coupling partner from the second coupling partner in order to open the torque path, and wherein a one of the first coupling partner and the second coupling partner is connected to the input shaft for rotation therewith.

2. The braking device according to claim 1, wherein the other one of the first coupling partner and the second coupling partner is connected to the second braking partner for rotation therewith or can be connected to a transmission shaft of the drive assembly of the vehicle for rotation therewith.

3. The braking device according to claim 1, wherein the braking device is designed as a dead-end module or as a dead-end device for the torque path.

4. The braking device according to claim 1, wherein the brake is designed as a multi-disc brake.

5. The braking device according to any claim 1, wherein the brake coupling device can maintain the coupling state and the release state in a force-free manner.

6. A vehicle having a drive assembly, wherein:

the drive assembly has an electric drive unit for generating a drive torque for the vehicle, the drive assembly has a transmission gearing for translating the drive torque, the transmission gearing has a gearing input for accepting the drive torque and a gearing output for outputting a translated drive torque in the direction of at least one driven wheel of the vehicle, such that a drive torque path is formed from the electric drive unit to the gearing output or to the at least one driven wheel, the drive assembly comprises the braking device according to claim 1, wherein the braking device can be brought into operative connection with the drive torque path in order to apply a braking torque to the at least one driven wheel along a braking torque path.

7. The vehicle according to claim 6, wherein:

the vehicle has a vibration management device, and the vibration management device is designed to compensate or dampen or modulate vibrations occurring in the drive assembly or in the vehicle by controlling the braking device.

8. The vehicle according to claim 6, wherein:

the vehicle has a service brake and the braking device is designed as a complementary brake or as a supplementary braking device to the service brake, the vehicle has a brake management device for controlling the service brake and the braking device, the brake management device is designed to implement a comfort braking state, and in the comfort braking state, the main braking deceleration is carried out by the braking device in order to bring the vehicle to a standstill.

9. The vehicle according to claim 6, wherein:

the braking device is or can be connected to the gearing input of the transmission gearing or to a rotor shaft of the electric drive unit for rotation therewith or the braking torque path runs via the transmission gearing, wherein the braking device is arranged in the braking torque path in front of the transmission gearing or the braking device can be operated at a speed of the electric drive unit.

* * * * *